United States Patent Office 3,410,688
Patented Nov. 12, 1968

3,410,688
BLACK-LINE DIAZOTYPE MATERIALS CONTAINING PLURAL COUPLING COMPONENTS FOR THERMAL DEVELOPMENT
Walter J. Welch, Port Dickinson, N.Y., assignor to GAF Corporation, a corporation of Delaware
No Drawing. Filed Dec. 9, 1964, Ser. No. 417,241
18 Claims. (Cl. 96—91)

ABSTRACT OF THE DISCLOSURE

Blackline diazotype material susceptible to thermal development, containing on a base a light-sensitive diazotype composition containing a compound which produces an alkaline environment at elevated temperatures, a light-sensitive diazo component, a coupler yielding therewith a blue dye, and a 2-alkylresorcinol in which the alkyl group contains 1 to 10 carbon atoms as a yellow brown coupler.

The present invention relates, in general, to diazotype materials and, in particular, to diazotype materials containing coupling components capable, upon thermal development, of yielding neutral black dye images.

Since the product of the coupling reaction is an azo dye, diazotype images are consequently produced in a variety of colors depending, to a great extent, on the choice of coupling components and, to a lesser extent, on the diazo compounds employed. There are many instances, however, wherein an esesntially neutral black diazotype image is desired but since azo dyes are invariably colored, the production of such an image is not always possible using a single dye. One method heretofore suggested for producing neutral black dye images involves employing mixtures of suitable coupling components in order to achieve the desired spectral response. Thus, in an effort to produce images that absorb in all the visible range, it is a common practice in the art to employ a mixture of coupling components one of which, on color coupling, produces a yellow dye and the other a blue dye to provide a simulated black dye image. One common coupler used to yield yellow dyes is resorcinol. However, using resorcinol in combination with couplers capable of forming blue dyes has not been satisfactory. It has, for instance, been difficult to produce neutral black diazotype images over a wide exposure range; i.e., at certain levels of exposure, the color balance is not preserved so that a degraded partially colored image is obtained rather than the desired neutral one. Such a defect is manifested as a degraded black image having a decided reddish or purplish aspect, and is, therefore, objectionable wherein a true neutral print is demanded.

It is, therefore, a particular purpose and object of this invention to provide new and novel coupling components which, on thermal development in the diazotype process, produces a neutral black diazotype image.

Other objects will be apparent as the description of the invention proceeds.

It has now been discovered that neutral black dye diazotype images can be readily produced from thermally developed light sensitive diazotype materials wherein the yellow component of the dye is formed by the light sensitive diazo coupling with a 2-alkyl resorcinol coupler of the formula:

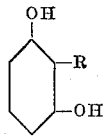

wherein R represents an alkyl of 1–10 carbon atoms such as methyl, ethyl, propyl, isopropyl, butyl, isobutyl, peptyl, hexyl, heptyl, octyl, nonyl, decyl, and the like.

Coupling components which are representative and illustrative of the formula above include the following structures:

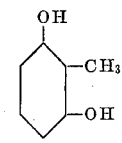

2-methylresorcinol

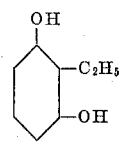

2-ethylresorcinol

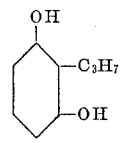

2-propylresorcinol

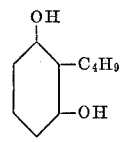

2-butylresorcinol

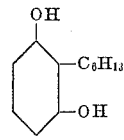

2-hexylresorcinol

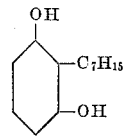

2-heptylresorcinol

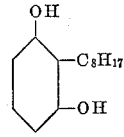

2-octylresorcinol

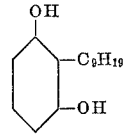

2-nonylresorcinol

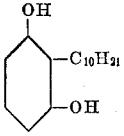

2-decylresorcinol

These yellow-brown couplers are used in combination with couplers capable of forming upon heat development a blue image. Preferred blue couplers include a sodium and potassium salts of 6,7-dihydroxynaphthalene-2-sulfonic acid and 2,7-dihydroxynaphthalene-3,6-disulfonic acid.

The diazo compartment utilized in the manufacture of the diazotype material is of the type generally employed in the diazotype art such as diazos from para-amino-N-ethyl-ortho-toluidine, para-amino-N-ethyl - N - hydroxy-ethylaniline, 4-para-morpholinyl aniline, para-amino-N-cyclohexyl-N-ethyl-aniline, 4-(4-methyl-1-piperizinyl)aniline, 2,5-diethoxyl-4-(4-methyl-1-piperazinyl)aniline, 2,5-diethoxy-4-ethoxy-carbonyl-1-piperazine, 2,5-diethoxy-4-propyl-1-piperazinyl-aniline and the like. Particularly, in order to produce images of high density in contrast, diazos characterized by thermal stability at temperatures below 125° C. are preferred. Typical and representative thermally stable diazos are disclosed in British Patent 909,491 and U.S. Patent 2,653,091.

The light sensitive diazotype materials are prepared in accordance with accepted techniques known in the art. Thus, the diazotype coating formulation will contain from about 0.5 to 5.0 parts of diazo per 100 parts of coating solution 2-alkyl resorcinol, in which the alkyl group contains from 1 to 4 carbon atoms, and are soluble in water. The higher 2-alkylresorcinols resuire the use of an organic solvent such as methanol, ethanol or isopropanol in the coating solution to provide the proper solvent action.

The coating solution, in addition to the light sensitive diazo, may contain various adjuncts usual in the manufacture of light senstive diazotype materials. These include metal salts for intensification of the dyestuff image, such as ammonium sulfate, nickel sulfate, zinc chloride and the like; stabilizing agents such as naphthalene trisulfonic acid and the like; acids acting to retard precoupling such as acetic acid, boric acid, citric, tartaric acid and the like; hygroscopic agents such as sucrose, poly vinyl alcohol and the like; and wetting agents such as saponin, lauryl sulfonate, keryl benzene sulfonate, the oleic acid amide of N-methyl taurine and the like. The heat developing materials also require the presence of a base or alkali progenitor such as the alkali metal salts of trichloro acetic acid, particularly the sodium and potassium salts.

The base to which the coating solution is applied may be any of these bases which have been previously suggested for use in the dizotype field. Examples of such bases are high grade all-sulfite bond paper, rayon or cotton cloth, starch filled cloth, Mylar (polyethylene terephthalate) and the like.

The following examples will serve to illustrate the practice of the invention. In these examples the parts are by weight unless otherwise stated.

EXAMPLE 1

Paper base material is coated uniformly with the following sensitizing composition:

| Ingredient— | Parts |
| --- | --- |
| Citric acid | 0.5 |
| Sodium 6,7 - dihydroxynaphthalene - 2 - sulfonate | 1.0 |
| Sodium trichloroacetate | 4.0 |
| Magnesium chloride | 0.5 |
| Diresorcyl sulfide | 0.2 |
| 2-methylresorcinol | 0.3 |
| 1,3,6-naphthalene trisulfonic acid | 3.0 |
| Formamide | 5.0 |
| 4 (N,N - dimethyl - aminobenzene-diazonium chlorozincate | 0.8 |
| Polyvinyl alcohol | 4.0 |
| Silica | 4.0 |
| Polyvinyl acetate emulsion | 4.0 |
| Water to make | 100.0 |

The sensitized paper is dried and exposed to light under a translucent original. Development is obtained by passing the paper through a suitable heating chamber at temperatures up to 300° F. A neutral black dye is formed.

A similar experiment employing resorcinol in place of 2-methylresorcinol resulted in an image having a purple black dye.

EXAMPLE 2

Paper base material is coated uniformly with the following sensitizing composition:

| Ingredient— | Parts |
| --- | --- |
| Citric acid | 0.5 |
| Sodium salt of 2,7-dihydroxynaphthalene-3,6-disulfonic acid | 1.0 |
| Sodium trichloracetate | 4.0 |
| Magnesium chloride | 0.5 |
| Diresorcyl sulfide | 0.2 |
| 2-ethylresorcinol | 0.3 |
| 1,3,6-naphthalene trisulfonic acid | 3.0 |
| Formamide | 5.0 |
| 4(N,N - dimethyl)aminobenzene - diazonium chlorozincate | 0.8 |
| Polyvinyl alcohol | 4.0 |
| Silica | 4.0 |
| Polyvinyl acetate emulsion | 4.0 |
| Water to make | 100.0 |

The sensitized paper is dried and exposed to light under a translucent original. Development is obtained by passing the paper through a suitable heating chamber at temperatures up to 300° F. A neutral black dye is formed.

A similar experiment employing resorcinol in place of 2-ethylresorcinol resulted in an image having a purple black dye.

Other experiments with other 2-alkylresorcinols such as 2-propylresorcinol, 2-butylresorcinol, 2-pentylresorcinol and the like provide neutral black dye images of the type illustrated in Examples 1 and 2.

While the invention has been described in certain of its embodiments it is obvious that modifications and variations therein can be made without departing from the spirit and scope thereof. Therefore, it is intended that the appended claims be interpreted to cover all such modifications and variations insofar as the state of the art permits.

What is claimed is:

1. Light-sensitive diazotype materials capable of providing a neutral black dye image after exposure to light through a translucent original and thermal development, comprising a base coated with a light-sensitive composition comprising a compound which produces an alkaline environment at elevated temperatures, a light-sensitive diazonium compound, a coupler which singularly form a blue azo dye with the said diazonium compound, and a 2-alkylresorcinol wherein the alkyl group contains 1 to 10 carbon atoms, which singularly would form a yellow-brown azo dye with the said diazonium compound.

2. The light sensitive diazotype material of claim 1 wherein the 2-alkylresorcinol is 2-methylresorcinol.

3. The light senstive diazotype material of claim 1 wherein the 2-alkylresorcinol is 2-ethylresorcinol.

4. The light sensitive diazotype material of claim 1 wherein the 2-alkylresorcinol is 2-propylresorcinol.

5. The light sensitive diazotype material of claim 1 wherein the 2-alkylresorcinol is 2-butylresorcinol.

6. The light sensitive diazotype material of claim 1 wherein the 2-alkylresorcinol is 2-pentylresorcinol.

7. The light sensitive diazotype material of claim 1 wherein the 2-alkylresorcinol is 2-hexylresorcinol.

8. The light sensitive diazotype material of claim 1 wherein the 2-alkylresorcinol is 2-heptylresorcinol.

9. The light sensitive diazotype material of claim 1 wherein the 2-alkylresorcinol is 2-octylresorcinol.

10. The light sensitive diazotype material of claim 1 wherein the diazo is 4-(N,N-dimethyl) aminobenzenediazonium chlorozincate.

11. The light sensitive diazotype material of claim 10 wherein the 2-alkylresorcinol is 2-methylresorcinol.

12. The light sensitive diazotype material of claim 10 wherein the 2-alkylresorcinol is 2-ethylresorcinol.

13. The light-sensitive diazotype material of claim 10 wherein the 2-alkylresorcinol is 2-propylresorcinol.

14. The light sensitive diazotype material of claim 10 wherein the 2-alkylresorcinol is 2-butylresorcinol.

15. The light sensitive diazotype material of claim 10 wherein the 2-alkylresorcinol is 2-pentylresorcinol.

16. The light sensitive diazotype material of claim 10 wherein the 2-alkylresorcinol is 2-hexylresorcinol.

17. The light sensitive diazotype material of claim 10 wherein the 2-alkylresorcinol is 2-heptylresorcinol.

18. The light sensitive diazotype material of claim 10 wherein the 2-alkylresorcinol is 2-octylresorcinol.

References Cited

UNITED STATES PATENTS

| | | | |
|---|---|---|---|
| 2,433,632 | 12/1947 | Soloman | 96—91 XR |
| 2,542,716 | 2/1951 | Slifkin | 96—91 |
| 3,224,878 | 12/1965 | Klimkowski et al. | 96—49 |
| 3,248,220 | 4/1966 | Van Rhijn | 96—91 |
| 3,301,679 | 1/1967 | Halperin et al. | 96—49 XR |

FOREIGN PATENTS

| | | |
|---|---|---|
| 435,874 | 10/1935 | Great Britain. |
| 636,891 | 5/1950 | Great Britain. |

OTHER REFERENCES

"Index of German Reports on Diazotype Research of Kalle & Co., A.G.," Report No. RM–168, March 1956, page 26 relied on.

Van der Grinten, "The Photographic Journal," vol. 92B, 1952, page 44 relied on.

NORMAN G. TORCHIN, *Primary Examiner.*

C. L. BOWERS, *Assistant Examiner.*